D. HIESTAND.
Carriage-Jacks.
No. 137,202. Patented March 25, 1873.
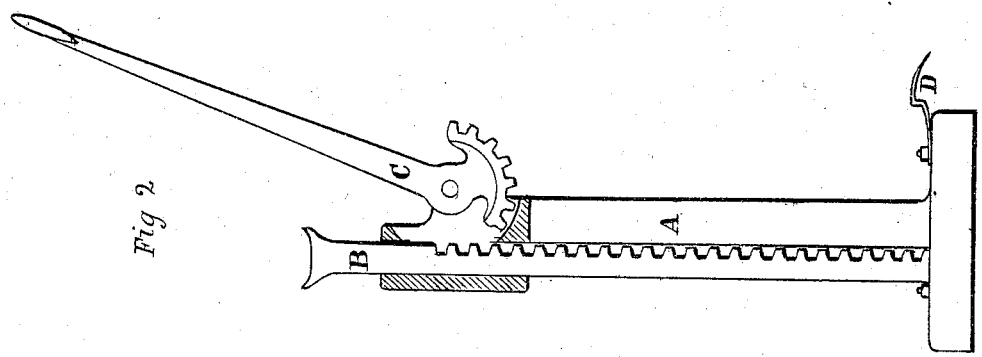
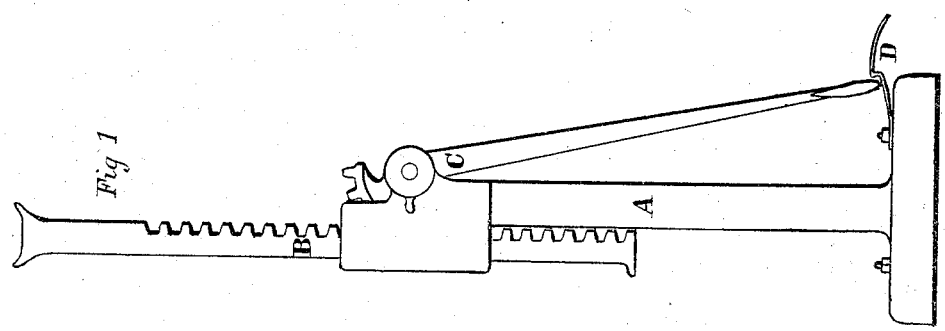
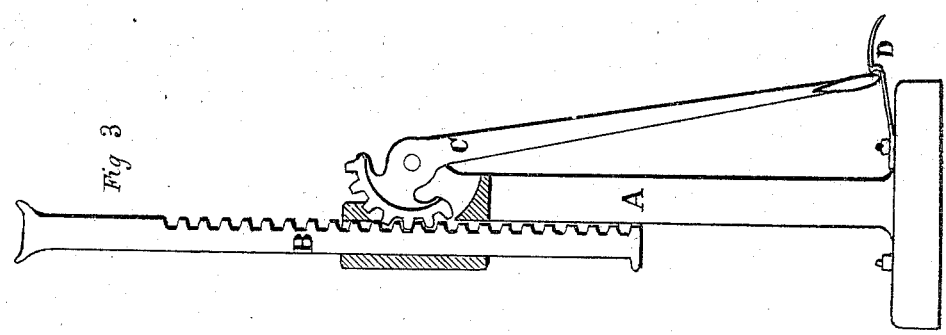
Witnesses: Chas. M. Griffith
Isaac P. Cadwalader
Inventor: David Hiestand

UNITED STATES PATENT OFFICE.

DAVID HIESTAND, OF PUGHTOWN, PENNSYLVANIA.

IMPROVEMENT IN CARRIAGE-JACKS.

Specification forming part of Letters Patent No. 137,202, dated March 25, 1873.

*To all whom it may concern:*

Be it known that I, DAVID HIESTAND, of Pughtown, in the county of Chester and State of Pennsylvania, have invented certain Improvements in Carriage-Jacks, of which the following is a specification:

The nature of my invention consists in combining an upright stock with a lever with cogs at its end and a spring-catch to hold the lever in place. The object of this improvement is to hold the elevated axle in place by a spring-catch attached to the stock in such a position as to grasp the lever at or near the handle, so that the wheel may be removed.

Figure 1 is a side elevation of my invention. Fig. 2 is a sectional view showing the lever raised. Fig. 3 is a sectional view showing the lever depressed.

A is the upright stock, upon which every other part is secured. B is the sliding rack, with cogs or teeth on one of its sides, and its upper end shaped to hold the axle or other weight to be elevated. It is secured to stock A by a bearing-piece that allows it to slide up or down. C is the lever, provided with cogs or teeth at one end, and secured to stock A by a pin, upon which it is pivoted, and from the center of this pin each cog or tooth is equidistant. Lever C meshes into sliding rack B in every position but one, and that is when the handle is raised to an upright position; it is then out of gear, and allows rack B to be raised or depressed by the hand to suit axles of different heights. D is a spring-catch to hold lever C in position when the axle is elevated.

For the purpose of elevating an axle or other load the handle of lever C is elevated, which throws the cogs on its end out of gear with rack B, which is then raised or depressed by the hand and applied to the axle; then by depressing the handle of lever C the cogs are brought into gear and the load elevated and secured in this position by spring-catch D.

I do not claim either of the four parts A B C D, separately, for I am aware that these are not new; nor do I claim the rack and segment, nor the chock operating on sliding bar; nor do I claim adjusting the sliding bar by the hand to suit different axles; but

I claim as my invention—

The spring-catch D, in combination with stock A and lever C, substantially as shown and described.

DAVID HIESTAND.

Witnesses:
   LEWIS SMITH,
   ISAAC P. CADWALADER.